United States Patent
Damsi (10) Patent No.: US 9,701,348 B2
(45) Date of Patent: Jul. 11, 2017

(54) STRUCTURAL SUPPORT AND HINGE MEMBER FOR A TARP SYSTEM

(71) Applicant: Everest Damsi, Perrysburg, OH (US)

(72) Inventor: Everest Damsi, Perrysburg, OH (US)

(73) Assignee: TARPSTOP, LLC, Perrysburg, OH (US)

( * ) Notice: Subject to any disclaimer, the term of this patent is extended or adjusted under 35 U.S.C. 154(b) by 0 days.

(21) Appl. No.: 14/670,053

(22) Filed: Mar. 26, 2015

(65) Prior Publication Data

US 2015/0274059 A1    Oct. 1, 2015

Related U.S. Application Data

(60) Provisional application No. 61/970,802, filed on Mar. 26, 2014.

(51) Int. Cl.
*B62D 33/04* (2006.01)
*B60J 7/06* (2006.01)

(52) U.S. Cl.
CPC ............ *B62D 33/04* (2013.01); *B60J 7/062* (2013.01)

(58) Field of Classification Search
CPC ..... B60J 7/022; B60J 7/06; B60J 7/062; B60J 7/065; B60J 5/02; B60J 7/102; B60J 7/104; B62D 27/065; B62D 29/008; B62D 33/0207; B62D 33/04

USPC ............ 160/328; 296/100.12, 186.1, 180.1, 296/180.4, 105, 100.1, 100.11, 104; 180/903

See application file for complete search history.

(56) References Cited

U.S. PATENT DOCUMENTS

| | | | | |
|---|---|---|---|---|
| 2,471,917 A * | 5/1949 | Wilson | ............. | B62D 33/04 296/186.1 |
| 5,538,313 A * | 7/1996 | Henning | ............. | B60J 7/065 296/100.12 |
| 5,924,759 A * | 7/1999 | DeMonte | ............. | B60J 7/062 296/100.12 |
| 6,312,040 B1 * | 11/2001 | Shinohara | ............. | B60J 7/065 296/100.12 |
| 6,793,273 B1 * | 9/2004 | Tuerk | ............. | B60J 7/062 296/180.1 |
| 7,249,796 B2 * | 7/2007 | Henning | ............. | B60J 7/102 296/105 |
| 7,931,326 B2 * | 4/2011 | Beshiri | ............. | B60J 7/102 296/100.17 |
| 8,235,447 B2 * | 8/2012 | Damsi | ............. | B60P 7/02 296/100.12 |
| 8,567,848 B2 * | 10/2013 | Damsi | ............. | B60J 5/02 296/186.1 |

* cited by examiner

*Primary Examiner* — Glenn Dayoan
*Assistant Examiner* — Sunsurraye Westbrook
(74) *Attorney, Agent, or Firm* — MacMillan, Sobanski & Todd, LLC

(57) ABSTRACT

A structural support and hinge member for a trailer tarpaulin latching system includes a mounting face, a support bracket, and a pivot defining a pivot axis.

20 Claims, 6 Drawing Sheets

STRUCTURAL SUPPORT AND HINGE MEMBER FOR A TARP SYSTEM

CROSS-REFERENCE TO RELATED APPLICATIONS

This application claims the benefit of U.S. Provisional Application No. 61/970,802, filed Mar. 26, 2014, the disclosure of which is incorporated herein by reference.

BACKGROUND OF THE INVENTION

This invention relates to the trucking industry and more specifically to tarp systems that can be used for covering flatbeds on trucks and trailers. In particular, this invention relates to a support member having a hinge function to position a hook and latch member used to secure a tarp portion to a fixed member in conjunction with a sliding tarp system.

Trucks and trailers that have flatbeds are used to transport a wide variety of freight, most of which cannot be loaded into conventional van-type trucks or trailers having walls and a roof. In order to protect the shipped goods from exposure to the outside elements, it is known to cover the flatbed with tarps. A tarp system can be used to secure the tarps to the flatbed to ensure optimal shipping conditions. A typical tarp system comprises a plurality of U-shaped frames or bows which are attached to the truck or trailer and support a covering, such as a tarpaulin (i.e., tarp) sheet or panel member. Enclosing structures, in the form of bulkheads or walls, are attached to the trailer at each end. The tarps are connected to the bulkheads by a latching system that functions to releasably secure the tarp to the bulkhead, stretch the tarp tight to create smooth and taut enclosed trailer sides, and create an environmentally resistant seal.

Known tarp latching systems can be difficult to latch. A catch or hook is typically attached to a conventional piano hinge that is mounted onto a forward most bow. The bow is attached to the tarp sheet. This arrangement makes it difficult to position the catch to the latch and create a smooth surface with minimal wrinkles. The wrinkles in a tarp fabric create undesirable drag and wear points when subjected to wind loads during highway travel. Conventional hinges, such as piano hinges or strap hinges, are heavy, expensive, and tend to over-constrain the latch system, which prevents the tarp from being stretched properly. Thus, it would be desirable to provide an improved connection for a tarp trailer enclosure that is also easier and faster to connect together.

SUMMARY OF THE INVENTION

This invention relates to a structural support and hinge member that permits a flexibly sided trailer enclosure to be secured to bulkheads and reduce wrinkling by improving the ability to position the tarp prior to latching.

In a first aspect of the invention, a trailer enclosure includes a plurality of bows where each bow is configured to support a flexible covering, and the plurality of bows define an interior space. A bulkhead, which can be configured as a headboard bulkhead, abuts one of the plurality of bows. A latch assembly has a tensioning fence and a clasp. The tensioning fence is supported for rotation on the bulkhead and the clasp is connected to a hinge panel. The clasp cooperates with the tensioning fence such that the latch assembly is moved from an open state where the clasp can be connected to the tensioning fence to a closed position where the clasp and tensioning fence are secured together. In the closed position, the clasp and tensioning fence are arranged such that tension in the hinge panel creates an over-center condition of the latch assembly. A structural support and hinge member supports a hinge axle connected to the clasp for at least one of rotation and translation relative to the bulkhead.

In a second aspect of the invention, a tarp enclosure system for a trailer includes a headboard bulkhead assembly. A plurality of frame members, including a generally horizontal frame member and two spaced apart, generally vertical frame members, form a first bow spaced proximate to the headboard bulkhead. A second bow is positioned proximate the first bow and a plurality of cross members extend between the first and second bows. A pair of spaced apart trolleys support the first and second bows for movement relative to the headboard bulkhead. A latch assembly includes a tensioning fence and a clasp. The tensioning fence is supported for rotation on the headboard bulkhead and the clasp is connected to a hinge panel. A structural support and hinge member supports a hinge axle connected to the clasp for at least one of rotation and translation relative to the headboard bulkhead. The structural support and hinge member has a mounting arm attached to the first bow.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figures 1, 2:
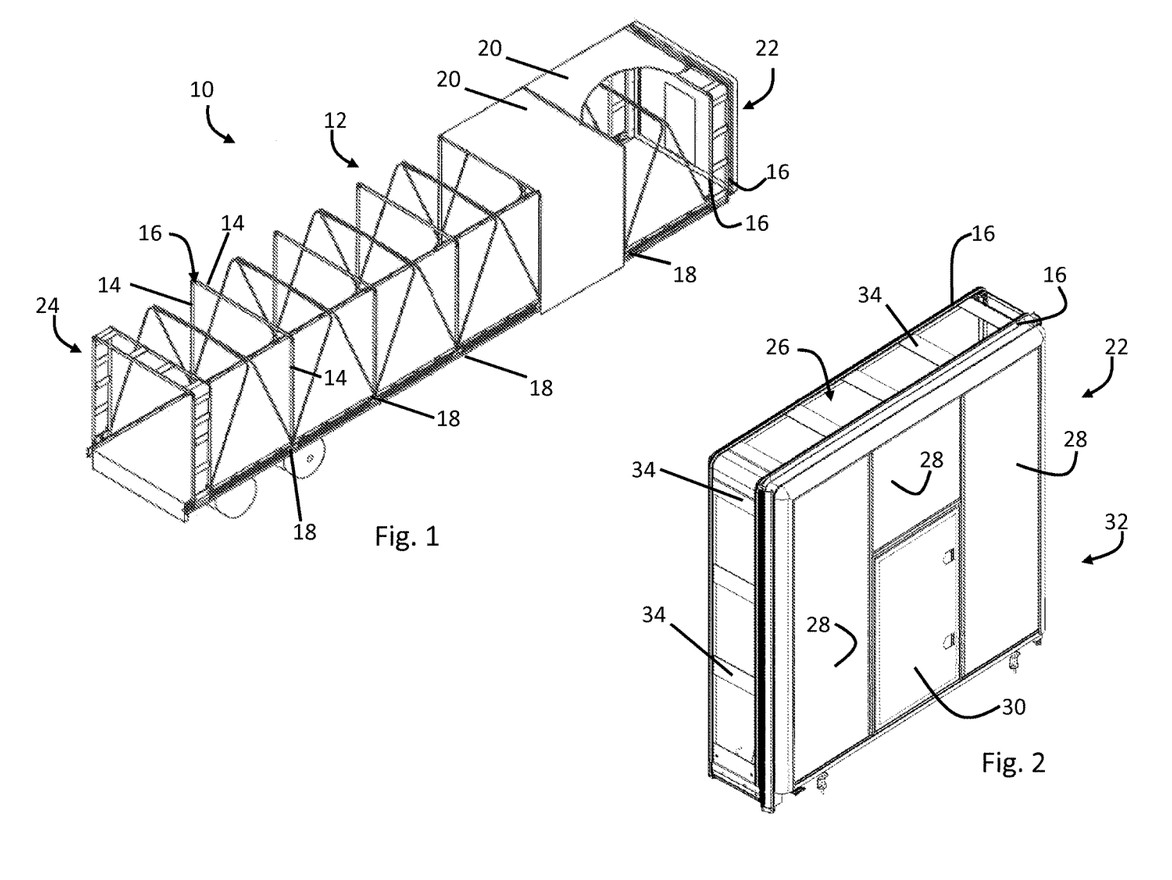
FIG. 1 is a perspective view of a flatbed trailer with a tarp system in accordance with the invention.
FIG. 2 is an enlarged perspective view of a bulkhead of the flatbed trailer and tarp system shown in FIG. 1 having a latching system.

Referring now to the drawings, there is illustrated in FIG. 1 a semi-truck trailer having a flexible enclosure system, shown generally at 10. The embodiment of the semi-truck trailer is illustrated as a flat bed trailer and provides an exemplary environment in which the various embodiments described herein may be used. Other trailer configurations having a flexible material enclosing at least a portion of the trailer are contemplated as being within the scope of the invention. The enclosed semi-truck trailer 10 includes a flexible enclosure system 12 having a plurality of frame members 14. The frame members 14 may be part a modular tarp system, such as is disclosed in U.S. Pat. No. 8,439,424 to Damsi, et al., the disclosure of which is incorporated by reference in its entirety. The frame members 14 are arranged together to form hoops or bows 16 that define an interior space. The bows 16 may be fixed to the trailer or may be mounted on wheels or trolleys 18 that permit the enclosure system 12 to be moved to expose the interior space to a varying degree. The bows 16 support a covering that, in one embodiment, may be a flexible covering 20. The flexible covering 20 may be a tarpaulin sheet, polymer sheet, plastic sheet or other flexible material. Alternatively, the covering may be overlapping panels that telescope as the bows 16 are moved. A bulkhead 22 encloses each end of the trailer 10. The bulkheads may be configured as a headboard 22 or an open, tailgate 24. The open tailgate 24 may be covered with the flexible covering 20 or may have one or more doors (not shown) mounted thereon.

Figures 3A, 3B:
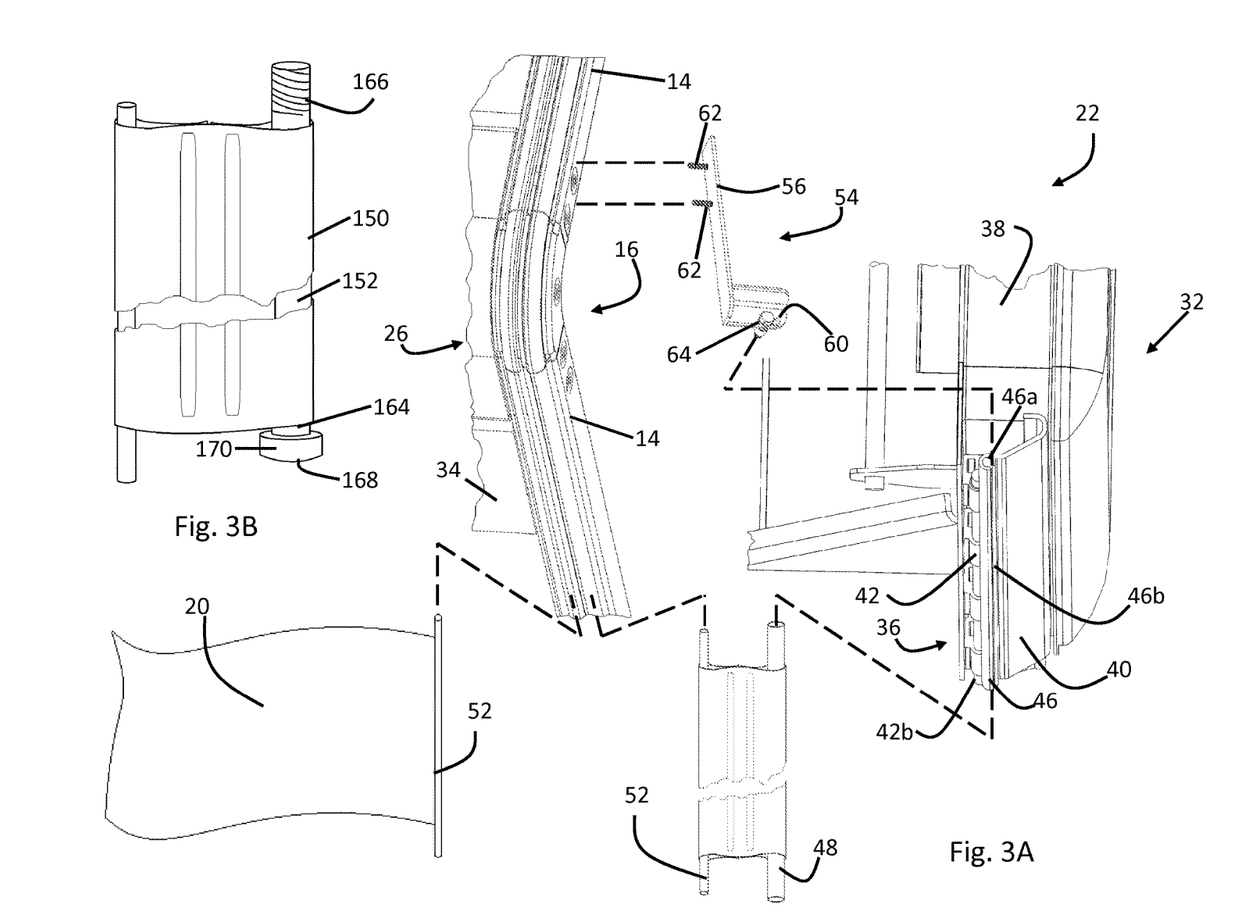
FIG. 3A is an assembled view of a bow and latching system including a structural support and hinge member, in accordance with the invention.
FIG. 3B is an enlarged view of an embodiment of a portion of a latching system in accordance with the invention.
Figure 4:
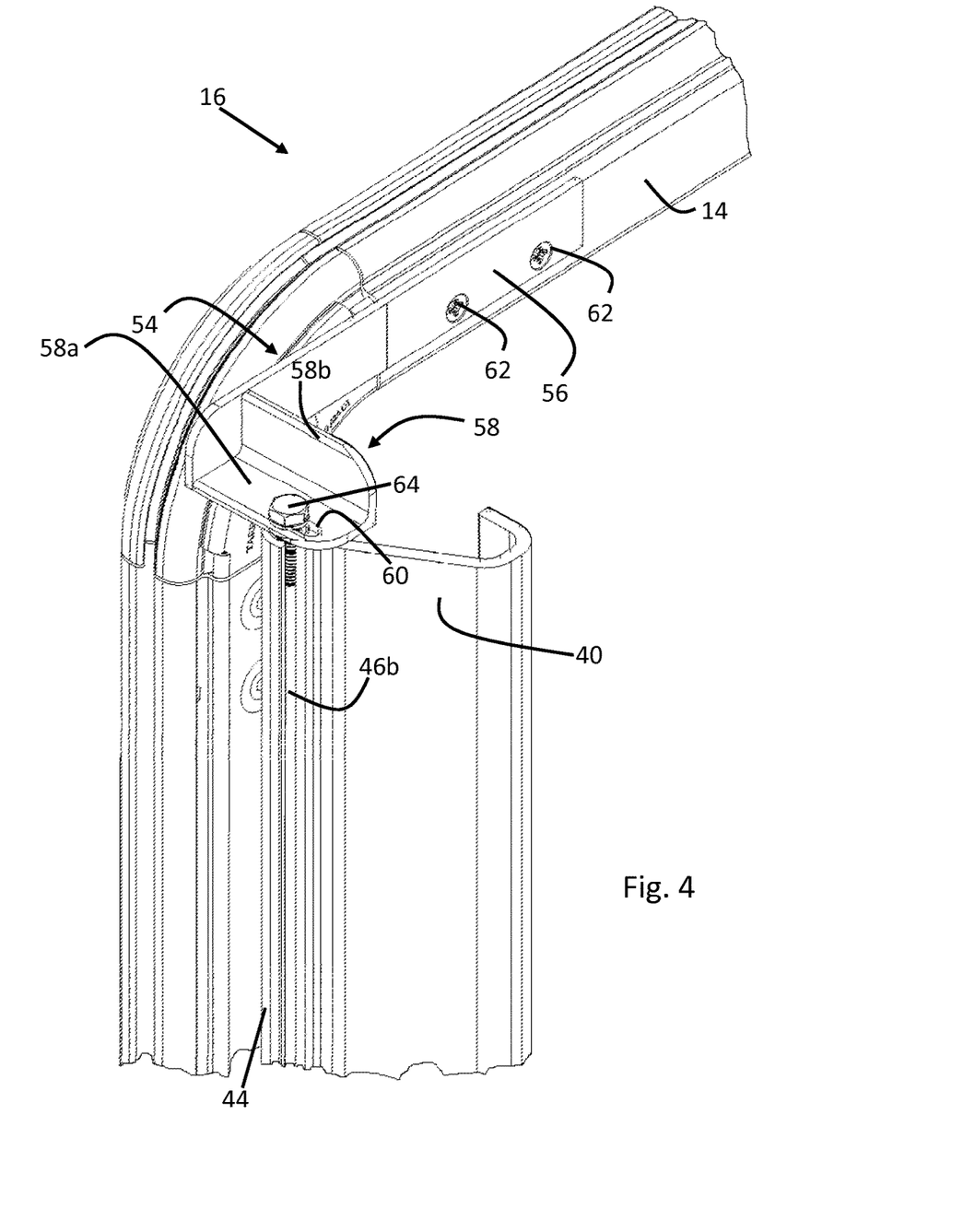
FIG. 4 is an exploded perspective view of an embodiment of a latching system having a structural support and hinge member, in accordance with the invention.

In the embodiment of FIG. 2, the headboard 22 is illustrated as a generally rigid, planar structure that includes a tarp supporting frame 26, one or more panels 28 and a door 30 that form an outer wall 32. The headboard 22, however, may be a single-piece molded structure of any shape, including non-planar, or a flexible covering similar to the tailgate 24. The headboard 22 is attached to the leading end of the trailer and is configured to resist wind loads during travel. As shown in FIGS. 2 and 3, the tarp supporting frame 26 includes a plurality of cross members 34 attached between two bows 16. The cross members 34 and the bows 16 of the tarp supporting frame 26, along with other frame supports (not shown), provide resistance against various loads, such as wind loads, tarp stretching loads, and the like.

Referring to FIG. 3a, the outer wall 32 includes a latch assembly, shown generally at 36, and shown as being mounted in a headboard channel 38. The latch assembly 36 includes a clasp 40 and a tensioning fence 42. The clasp 40 includes a hook 44 and a tarp mounting channel 46. In one embodiment, the clasp 40 is formed as an extrusion and made from, for example, aluminum. Alternatively, the clasp 40 can be a polymer or fiberglass-reinforced pultruded structure. In another embodiment, the clasp 40 may be an extruded or roll-formed steel component, such as a stainless steel component. Alternatively, the clasp 40 may be bent or formed by any suitable process. A latch post 42a of the tensioning fence 42 engages an inner surface of the hook 44 to secure the clasp 40 and the associated flexible covering 20. The tensioning fence 42 rotates about a latch hinge 42b to be moved from an unlatched or open position to a latched or closed position.

Figure 5:
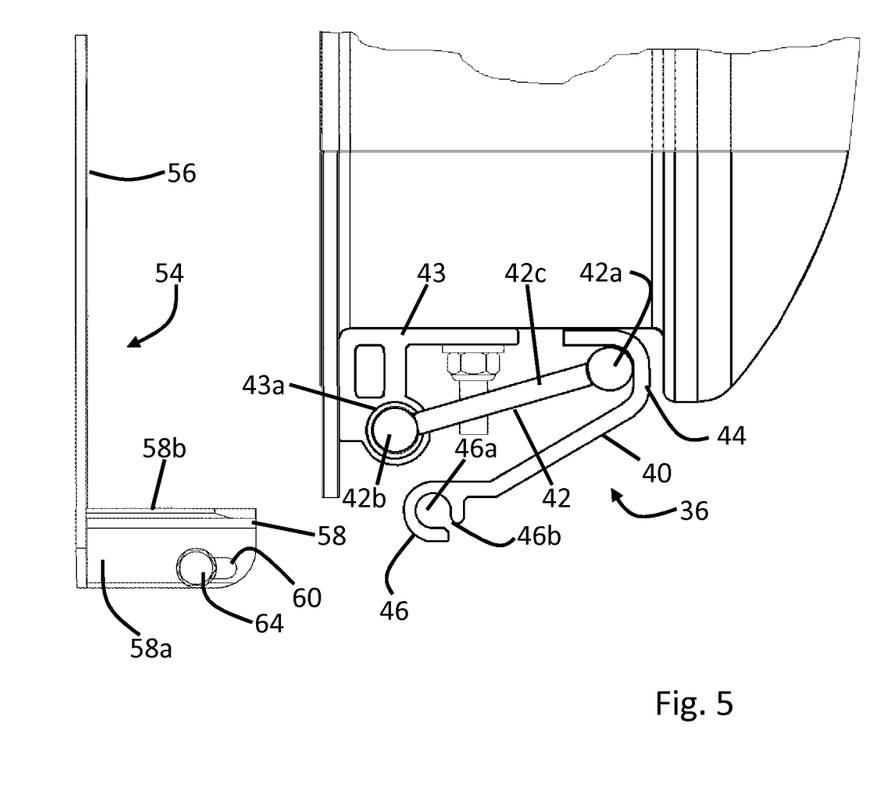
FIG. 5 is a plan view of a portion of the latching system of FIG. 4.
Figures 6, 7, 10:
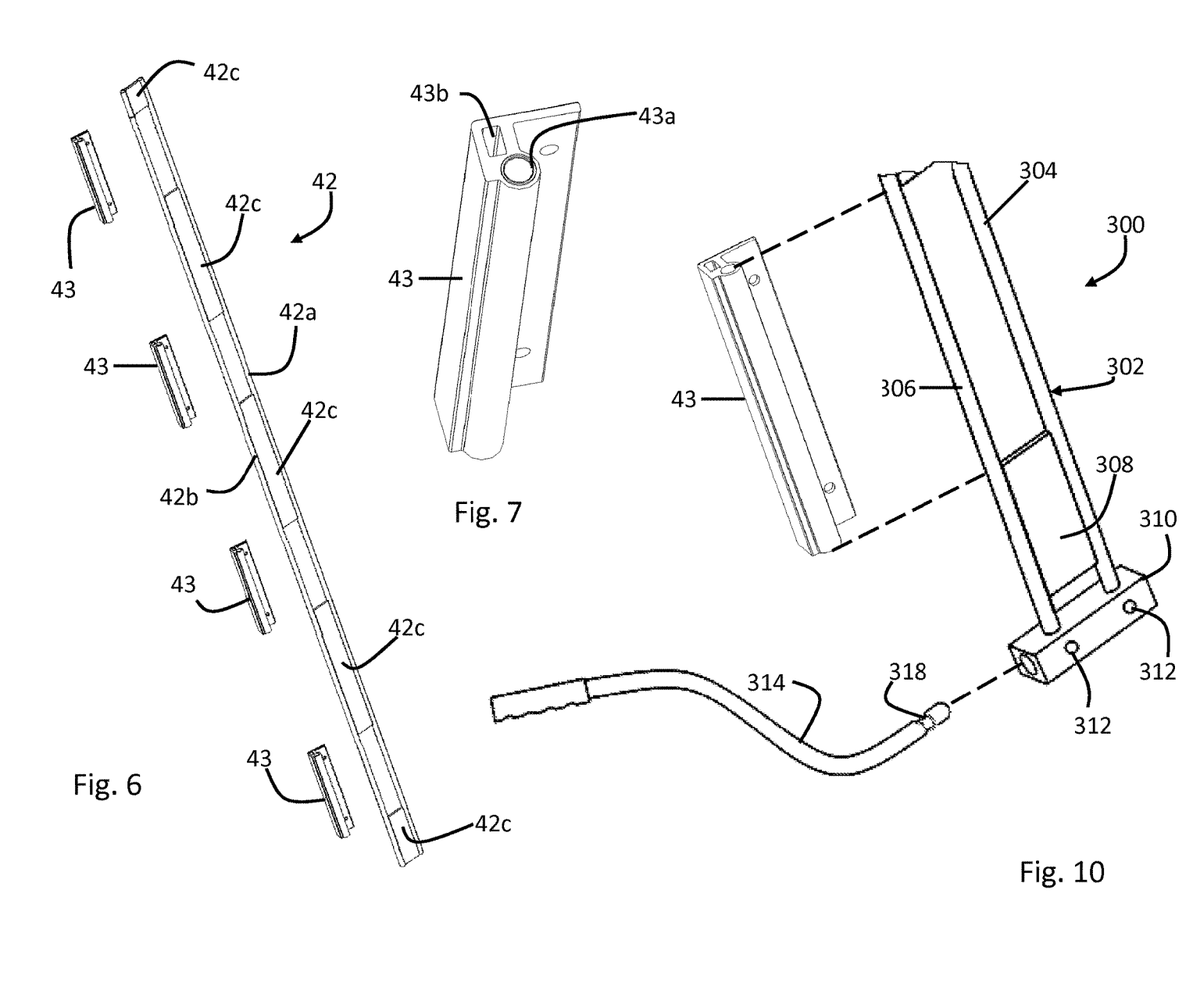
FIG. 6 is an exploded, perspective view of a portion of a latching system of FIG. 4.
FIG. 7 is an enlarged perspective view of a portion of the latching system of FIG. 6.
FIG. 10 is an enlarged, perspective view of an embodiment of a portion of a latching system in accordance with the invention.

As shown in FIGS. 3A, 5, and 6, a fence mounting bracket 43 engages and supports the latch hinge 42b of the tensioning fence 42 for rotation between the open position, where the hook 44 of the clasp 40 can be positioned on the latch post 42a, and a closed position, where the latch post 42a draws the hook 44 in toward the bulkhead 22 and past the center of rotation of the latch hinge 42b. The latch post 42a and the latch hinge 42b are connected together by fence spacers 42c that define the amount of movement of the latch post 42a past the rotational center of the latch hinge 42b and transmit the tensioning forces to the bulkhead 22. The fence mounting bracket 42b is shown attached to the headboard channel 38. The tensioning fence 42 functions as an over-center clamp and utilizes the tensioning force of the flexible covering 20 to secure the clasp 40 in place. The latch hinge 42b of the tensioning fence 42 is supported for rotation relative to the fence mounting bracket 43 by a hinge bushing 43a. The hinge bushing 43a may be made from any suitable material, such as aluminum, bronze, polymer (including PTFE, fiberglass, polyamide-imide, and any other suitable plastics). In one embodiment, the fence mounting bracket 43 is formed from an aluminum extrusion. Aluminum provides weight reductions over steel components as well as improved corrosion resistance. The extrusion process permits formation of a void 43b, as a weight reduction structure, that extends longitudinally through the part. The void 43b provides reduced weight without sacrificing strength and fatigue performance.

As best shown in FIGS. 3A and 5, the tarp mounting channel 46 has a generally C-shaped cross section that forms a central cavity 46a and defines a slot 46b. The tarp mounting channel 46 is configured to accept a first attachment bead 48 that secures a hinge panel 50 to the clasp 40. The hinge panel 50 further includes a second attachment bead 52 that connects the hinge panel 50 to the frame member 14. The attachment bead 52 also connects the flexible covering 20 to the frame member 14 in a similar manner. The attachment beads 48 and 52 may be connected to the hinge panel 50, and also to the flexible covering 20, in any suitable manner. In one embodiment, the material forming the hinge panel 50 is wrapped around the attachment beads 48 and 52 and secured at an overlapping point. The material may be stitched, glued, stapled, heat bonded, heat or chemically welded together to form the hinge panel 50. The hinge panel 50 extends through the slot 50. The slot 46b is sized to prevent the attachment bead 48 from being pulled through the slot 46b so that the clasp 40 can apply an even tensioning load to the hinge panel 50, the tensioning fence 42, and the frame member 14. In addition, the hinge panel 50 provides environmental protection to the latch assembly 36. In the illustrated embodiment, the central cavity 46a also provides an attachment point for a structural support and hinge member, shown generally at 54, as will be described below.

The structural support and hinge member 54 includes a mounting arm 56 and a pivot support 58 having a hinge point 60. The mounting arm 56 attaches to the bow 16 by way of fasteners 62, though any suitable fastening structure may be used. The mounting arm 56 is illustrated as attaching to a discrete length section of the frame member 14 that spans the upper width of the enclosure. Alternatively, the mounting arm 56 may span the entire width of the enclosure. The pivot support 58 includes a includes a pivot mount 58a and a reinforcing gusset 58b. The hinge point 60 is illustrated as an elongated aperture or slot formed through the pivot mount 58a. The hinge point 60 permits both rotational movement and longitudinal positioning of the clasp 40. The rotational movement permits the tensioning fence 42 to close the clasp 40. The longitudinal positioning permits the clasp 40 to maintain proper tension and absorb tolerance variations associated with manufacture of the flexible covering 20. The reinforcing gusset 58b stiffens the cantilevered pivot mount 58a against the reaction forces of the clasp 40 and the hinge panel 50. Additionally, the reinforcement gusset 58b stiffens the portion of the mounting arm 56 that extends away from the fasteners 62. A hinge axle 64 connects to the clasp 40. In the illustrated embodiment, hinge axle 64 is a bolt that mounts in the central cavity 48 of the clasp 40.

In another embodiment shown in FIG. 3B, a hinge panel 150 includes a hinge axle 164. The hinge axle 164 includes an attachment bead 152 having an end 166 that extends above the clasp 40. The hinge axle 164 further includes an end 168 that extends below the clasp 40 and includes a retaining feature 170, such as a nut, enlarged head, or similar structure to prevent the central cavity 48 from disengaging the attachment bead 52. The end 166 of the hinge axle 164 may be a threaded end connected to the hinge point 60 with a nut (not shown) or a straight section retained with a cotter pin or the like (not shown). A split bushing (not shown) may be disposed in the slot that defines the hinge point 60 to ease rotation and longitudinal movement of the clasp 40 after the hinge axle 64 is tightened.

The clasp 40 is suspended by the hinge axle 64 or 164 from the structural support and hinge member 54. In one embodiment, a single hinge axle 64 is used to mount and support the clasp 40. In addition, the single hinge axle 64 supports the weight of the clasp 40 and a portion of the flexible covering 20. The single hinge axle 64 permits the clasp 40 to seek an equilibrium point or orientation that balances the tensioning forces of the hinge panel 50 and the flexible covering 20 so that they are generally evenly distributed over the length of the tensioning fence 42. Thus, the suspension configuration of the illustrated embodiment reduces or eliminates forces resolved at a conventional hinge, such as the piano hinges described above. By contrast, prior art hinges, such as piano hinges, will resolve some of the tensioning forces along the hinge pin, which deflects and can permanently deform in response to the forces. Once this occurs, subsequent opening of the end connection is difficult because the hinge pin is bent. In addition, the fatigue life of a hinge in such a condition is reduced.

Referring again to FIGS. 2 and 3, in one embodiment, the forward most bow 16, shown as part of the tarp supporting frame 26, supports one end of the hinge panel 50, which may be integrally formed with the flexible covering 20. The tarp mounting channel 46 supports the other end, as described above. As shown in FIGS. 3A and 3B, the hinge panel 50 is a short portion of flexible covering material that is configured generally similarly to the other sections of flexible coverings 20 that span between the bows 16 along the length of the enclosure. In one embodiment, the hinge panel 50 is a flexible covering section in a range of about 1 inch to about 9 inches. In a more specific embodiment, the length of the hinge panel section is in a range of about 2 inches to about 4 inches. The hinge panel 50 is of sufficient length such that one attachment bead 52 may be secured to a frame member 14 of the bow 16 and another attachment bead 48 at the other end can be secured to the clasp 40.

Figure 8:
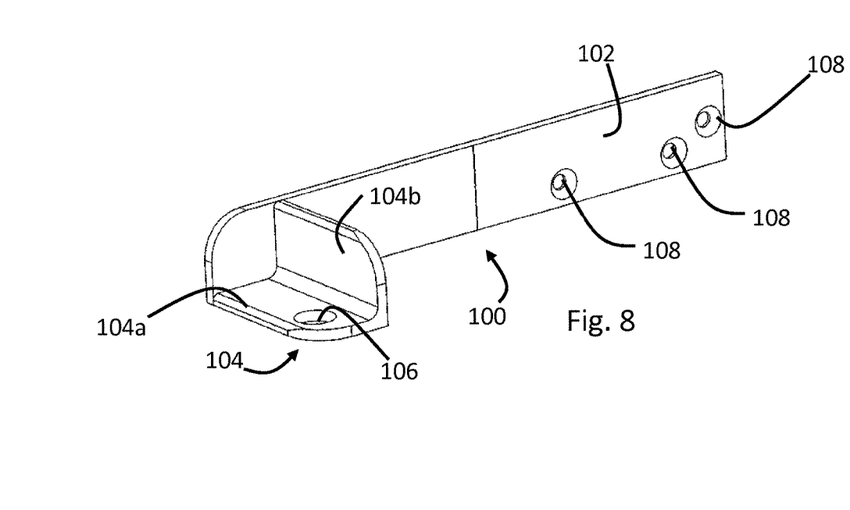
FIG. 8 is a perspective view of another embodiment of a structural support and hinge member.

Referring now to FIG. 8, there is illustrated another embodiment of a structural support and hinge member, shown generally at 100. The structural support and hinge member 100 includes a mounting arm 102 and a pivot support 104 having a hinge point 106. The mounting arm 102 includes a plurality of attachment apertures 108. The pivot support 104 includes a pivot mount 104a and a reinforcing gusset 104b. The hinge point 106 is formed through the pivot mount 104a and is configured as a round hole, though other non-elongated shapes may be used. The hinge point 106 permits rotation but prevents longitudinal positioning of the clasp 40. The mounting arm 102 is configured to extend along the width dimension of the bow 16.

Figure 9:
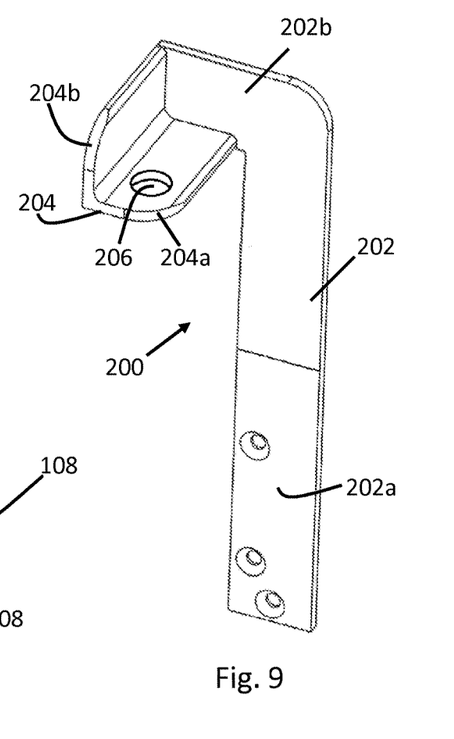
FIG. 9 is a perspective view of yet another embodiment of a structural support and hinge member.

Referring now to FIG. 9, there is illustrated yet another embodiment of a structural support and hinge member, shown generally at 200. The structural support and hinge member 200 includes a mounting arm 202 and a pivot support 204. The pivot support 204 includes a pivot mount 204a and a reinforcing gusset 204b. The mounting arm 202 is configured to mount to a vertical portion of the bow 16 and includes an attaching base 202a and an offset leg 202b. The offset leg 202b permits a hinge point 206 to be aligned with the central cavity 38 of the clasp 40.

Referring now to FIG. 10, there is illustrated an embodiment of a latch assembly, shown generally at 300. The latch assembly 300 includes a tensioning fence 302 that is similar to the tensioning fence 42, described above. The tensioning fence 302 includes a latch post 304 and a latch hinge 306. The latch post 304 and latch hinge 306 are connected together along various positions over the length by a plurality of fence spacers 308. An actuating connector block 310 is connected to the latch post 304 and latch hinge 306 by any suitable structure. In the illustrated embodiment, the actuating connector block 310 includes attachment holes 312 that may accept bolts (not shown) to secure the post 304 and hinge 306 thereto. Alternatively, the post 304 and hinge 306 may be welded to the block 310. A locking handle 314 may be connected to the block 310 by a handle mounting aperture 316 and secured by attachment hole 312. The locking handle 314 may include a groove 318 that retains the handle 314 within the block 310 yet permits rotation of the handle, particularly for stowing and securing.

Figure 11:
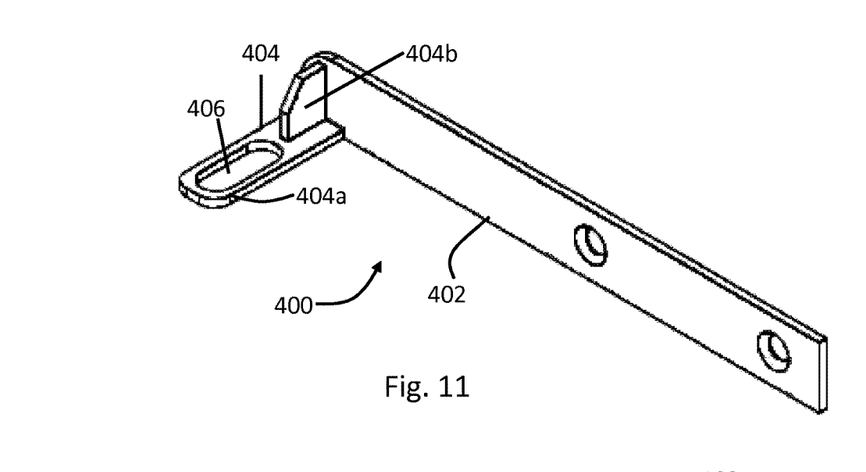
FIG. 11 is a perspective view of another embodiment of a structural support and hinge member.

Referring now to FIG. 11, there is illustrated another embodiment of a structural support and hinge member, shown generally at 400. The structural support and hinge member 400 includes a mounting arm 402 and a pivot support 404. The pivot support 404 includes a pivot mount 404a and a reinforcing gusset 404b. The pivot mount 404a includes a slotted hinge point 406 formed therethrough. The reinforcing gusset 404b is generally centered in the width of the pivot mount 404a and extends from the mounting arm 402 toward the slotted hinge point 406. The mounting arm 402 is illustrated to mount along the width dimension of the bow 16, similar to structural support and hinge member 100, described above. Alternatively, the mounting arm 402 may be configured in a manner similar to structural support and hinge member 200, if so desired.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A trailer enclosure comprising:
   a plurality of bows, each bow configured to support a flexible covering, the plurality of bows defining an interior space;
   a bulkhead;
   a latch assembly having a tensioning fence and a clasp, the tensioning fence supported for rotation on the bulkhead and the clasp connected to a hinge panel, the clasp cooperating with the tensioning fence such that the latch assembly is moved from an open state where the clasp can be connected to the tensioning fence to a closed position where the clasp and tensioning fence are secured together such that tension in the hinge panel creates an over-center condition of the latch assembly; and
   a structural support and hinge member supporting a hinge axle connected to the clasp for at least one of rotation and translation relative to the bulkhead.

2. The trailer enclosure of claim 1 wherein the bulkhead is a headboard configured to be attached to a leading end of a trailer and the structural support and hinge member defines a pivot support with a hinge point that supports the hinge axle.

3. The trailer enclosure of claim 2 wherein the pivot support includes a pivot mount having the hinge point configured as one of a slot and a hole formed through the pivot mount and a reinforcing gusset.

4. The trailer enclosure of claim 3 wherein the reinforcing gusset is connected to an edge surface of the pivot mount.

5. The trailer enclosure of claim 3 wherein the reinforcing gusset is generally centered along a width of the pivot mount.

6. The trailer enclosure of claim 1 wherein an attachment bead connects the hinge panel to the clasp and the hinge axle is integrally formed with the attachment bead, the structural support and hinge member having a mounting arm configured to mount to a generally vertical portion of one of the plurality of bows that abuts the bulkhead, the mounting arm including an attaching base and an offset leg that permits a hinge point supporting the hinge axle to be aligned with a central cavity of the clasp.

7. The trailer enclosure of claim 1 wherein the hinge axle is a single bolt threaded into a central cavity of the clasp and the structural support and hinge member includes a mounting arm that attaches to a generally horizontal portion of one of the plurality of bows that abuts the bulkhead.

8. The trailer enclosure of claim 1 wherein the latch assembly is a hooked hinge system hanging by the hinge axle, the hinge axle being a single hinge axle that permits the clasp to rotate relative to the tensioning fence, and the structural support and hinge member is attached to a bow member abutting the bulkhead.

9. The trailer enclosure of claim 8 wherein the clasp is a clasp extrusion having a hook that engages the tensioning fence, the clasp extrusion having a tarp mounting channel that accepts an attachment bead to connect the hinge panel to the clasp.

10. The trailer enclosure of claim 1 wherein the clasp is an extruded clasp having a hook and a tarp retaining channel, the structural support and hinge member vertically supports the extruded clasp by a pivot mount that supports the hinge axle, the tarp retaining channel having a threaded area that accepts the hinge axle to permit rotation and support loads created by the hinge member and the clasp, and the structural support and hinge member is mounted onto a generally horizontal section of one of the plurality of bows proximate to the bulkhead.

11. The trailer enclosure of claim 10 wherein the hinge axle is one of a bolt and a pin that permits rotation of the clasp relative to the bulkhead, the hinge panel having a flexible tarp section, the clasp configured to engage the tensioning fence such that the hinge panel creates a tensioning force that causes the tensioning fence to snap closed in an over-center arrangement with the clasp to secure the flexible covering to the bulkhead.

12. The trailer enclosure of claim 11 wherein the flexible tarp section of the hinge panel has a width of not more than 9 inches.

13. A tarp enclosure system for a trailer comprising:
    a headboard bulkhead assembly;
    a plurality of frame members including a generally horizontal frame member and two spaced apart, generally vertical frame members forming a first bow spaced proximate to the headboard bulkhead;
    a second bow;
    a plurality of cross members extending between the first and second bows;
    a pair of spaced apart trolleys supporting the first and second bows for movement relative to the headboard bulkhead;
    a latch assembly having a tensioning fence and a clasp, the tensioning fence supported for rotation on the headboard bulkhead and the clasp connected to a hinge panel, where the clasp and tensioning fence are secured together such that tension in the hinge panel creates an over-center condition of the latch assembly; and
    a structural support and hinge member supporting a hinge axle connected to the clasp for at least one of rotation and translation relative to the headboard bulkhead, the structural support and hinge member having a mounting arm attached to the first bow.

14. The tarp enclosure system of claim 13 wherein the structural support and hinge member includes a pivot support defining a slotted hinge point that supports the hinge axle for rotational and translational movement and the mounting arm is arranged to connect to the generally horizontal frame member of the first bow.

15. The tarp enclosure system of claim 13 wherein the structural support and hinge member includes a pivot support defining a hinge point that supports the hinge axle for rotational movement and the mounting arm includes an attaching base arranged to connect to the generally vertical frame member of the first bow and an offset leg between the attaching base and the pivot support, the offset leg permitting the hinge point to be generally aligned with a central cavity of the clasp.

16. The tarp enclosure system of claim 13 wherein the structural support and hinge member includes a pivot support having a reinforcing gusset and defining a hinge point that supports the hinge axle for rotational movement and the mounting arm is arranged to connect to the generally horizontal frame member of the first bow.

17. The tarp enclosure system of claim 16 wherein the reinforcing gusset is arranged in a generally central portion of the pivot support proximate to the hinge point.

18. A latching system for an enclosed trailer cover comprising:
    a tensioning fence supported for rotation;
    a clasp connected to a flexible tarp hinge panel, the clasp cooperating with the tensioning fence such that the latch assembly is moved from an open state where the clasp can be connected to the tensioning fence to a closed position where the clasp and tensioning fence are secured together such that tension in the hinge panel creates an over-center condition of the latch assembly; and
    a structural support and hinge member having a pivot mount, a reinforcing gusset, and a mounting arm, the pivot mount defining a hinge point that supports a single hinge axle connected to the clasp for at least one of rotation and translation, the reinforcing gusset connected between the pivot mount and the mounting arm.

19. The latching system of claim 18 wherein the hinge point is a slotted hinge point that supports the hinge axle for rotational and translational movement and the mounting arm is arranged to connect to a generally horizontal frame member.

20. The latching system of claim 19 wherein the hinge point supports the hinge axle for rotational movement and the mounting arm includes an attaching base arranged to connect to the generally vertical frame member, the mounting arm further including an offset leg between the attaching base and the pivot mount, the offset leg permitting the hinge point to be generally aligned with a central cavity of a clasp.

* * * * *